United States Patent Office 3,201,382
Patented Aug. 17, 1965

3,201,382
PROCESS FOR PREPARING A BIOCHEMICALLY ACTIVE POLYPEPTIDE FROM SHEEP PITUITARY GROWTH HORMONE
Joseph Bornstein, 305 Orrong Road, East St. Kilda S.16, Melbourne, Victoria, Australia
No Drawing. Filed July 6, 1961, Ser. No. 122,103
1 Claim. (Cl. 260—112)

This invention relates to a new polypeptide and a process for its preparation. More particularly, it is concerned with a unique biochemically active polypeptide and with a process of preparing this product from human or animal growth hormones and preparations containing such hormones.

It is an object of this invention to provide a new biochemically active polypeptide. Another object is to provide methods for the preparation and isolation of this active polypeptide. Other objects will be apparent from the detailed description of this invention hereinafter provided.

In accordance with this invention, it is now found that growth hormone, either animal or human growth hormone, can be hydrolyzed in acidic solutions to produce a polypeptide having unique biochemical properties. The process of the present invention can be carried out utilizing either purified preparations of animal or human growth hormone or other preparations containing these growth hormones such as pituitary glands or fractions obtained from pituitary glands. Thus, animal pituitary glands or the acetone insoluble portion of animal pituitary glands can be utilized as starting materials in the process of the present invention. Similarly, other impure concentrates of pituitary glands or more purified compositions containing the growth hormone can be utilized in the preparation of the active polypeptide of the present invention.

In carrying out the acid hydrolysis of the preparations containing growth hormones, these starting materials are subjected to acid hydrolysis at a pH of between about 1.5 to about 2.5 for sufficient time to effect the partial hydrolysis of the growth hormone and produce the desired biochemically active polypeptide. The process is most conveniently effected by intimately contacting the source of growth hormone with hydrochloric acid at a pH between 1.5 and 2.5 in an aqueous solvent medium. I have found that this process is readily effected in an extraction solvent consisting of 4 volumes of ethanol, 0.4 volume of n-butanol, 0.4 volume of toluene, and 1.0 volume of water. Under these conditions of acid hydrolysis, the biochemically active polypeptide is insoluble in the solvent mixture and is readily recovered by filtration.

The active polypeptide produced during the acid hydrolysis is isolated from the resulting dried residue by extracting it with 0.1 M acetic acid, subjecting the acetic acid extracts to ultrafiltration, passing the resulting ultrafiltrate through a cation exchange resin on the hydrogen cycle to remove impurities, recovering the non-adsorbed material by washing the column with water, precipitating the active product by adding a mixture of ethanol and ethyl ether to the resin eluate, recovering the resulting precipitate, dissolving the dried recovered precipitate in a small amount of water, adjusting the hydrogen ion concentration of this solution to about pH 8.5 with ammonia, filtering off the resulting precipitate, adding sufficient volume of an ethanol-ethyl ether mixture to cause precipitation of the desired polypeptide, and recovering and drying the resulting precipitate.

The processes for the production of the biologically active polypeptide and for its isolation are illustrated in the following examples.

Example 1

Sheep pituitary glands are rapidly blended with 10 volumes of acetone per weight of glands and the insoluble solids recovered by filtration. The resulting filter cake is again resuspended in 10 volumes of acetone, stirred vigorously for one hour and then filtered. The cake is then washed with a mixture of ethanol-ether (1:1) and air dried.

100 g. of dried sheep pituitary powder prepared in this manner are suspended in 150 ml. of extraction solvent (ethanol 4 vol., n-butanol 0.4 vol., toluene (sulfur free) 0.4 vol. and water 1 vol.) and stirred. Sufficient concentrated hydrochloric acid is added to the suspension to bring the pH to 2 and the stirring continued for an hour. The resulting suspension is filtered, and the residue is resuspended in a further 150 ml. of the same extraction solvent, adjusted to pH 2 and stirred for an hour. The suspension is again filtered, and the extraction procedure repeated twice more with 150 ml. of extraction solvent. The filtered solids finally obtained are suspended in a small amount of extraction solvent and the resulting paste incubated at 37° C. for 5 hours. The incubated paste is then dried under reduced pressure to remove all traces of solvents.

The dry cake is pulverized to a powder and extracted for 30 minutes with 100 ml. of 0.1 M acetic acid and the extract recovered by filtration; the filter cake being washed with a further 100 ml. of 0.1 M acetic acid.

The combined acetic acid extracts are then filtered through cellophane in a large Graber type ultrafilter under 45 lb. per square inch pressure and 180 ml. of ultrafiltrate recovered.

The resulting ultrafiltrate is then passed through a column 40 cm. in length and 5 cm. diameter containing a cation exchange resin (Amberlite IRC–120, a sulfonated polystyrene resin cross-linked with 8% divinyl benzene) on the hydrogen cycle. The nonadsorbed material is collected by washing the column with water.

The 300 ml. of aqueous column eluate is then mixed with 10 volumes of dry ethanol-ethyl ether mixture (1:1 by volume) which causes precipitation of a buff colored product. The resulting mixture is kept at 4° C. for 16 hours, after which the precipitate is recovered by centrifugation and then dried under reduced pressure.

The dried buff product so obtained is dissolved in a minimum amount of water (about 20 ml.), adjusted to pH 8.5 by the addition of dilute ammonia, and allowed to stand at 4° C. for 16 hours. The resulting precipitate is removed by filtration on a coarse sintered glass funnel.

To the filtrate (16 ml.) is added 10 volumes of dry ethanol-ethyl ether (1:1 by volume) and the resulting mixture allowed to stand for 16 hours. The white precipitate is recovered by centrifugation and dried to yield 23.8 mg. of active peptide.

Example 2

One g. of sheep growth hormone is dissolved in 20 ml. of 0.005 M hydrochloric acid and 110 ml. of extraction solvent (4 volumes of ethanol, 0.4 volume of n-butanol, 0.4 volume of toluene (sulfur), 1 volume of water) is added. Hydrochloric acid is then added to bring the pH to 2. The resulting mixture is stirred at 24° C. for 5 hours. After about 20 minutes a fine precipitate begins to form and the precipitation appears to be complete after about 5 hours.

The precipitated product is recovered by centrifugation, resuspended in a minimum of the extraction solvent at pH 2 and incubated at 37° C. for 5 hours. The excess extraction solvent is then removed by centrifugation and the precipitate dried under reduced pressure.

The resulting dried precipitate is dissolved in 25 ml. of 0.1 M acetic acid and ultrafiltered through cellophane at 45 lb. per square inch pressure.

The resulting ultrafiltrate is then passed through a column of a cation exchange resin (Amberlite IRC–120) on the hydrogen cycle and the non-adsorbed material recovered by washing the column with water.

To 75 ml. of the aqueous solution recovered from the cation exchange column is added 10 volumes of ethanol-ethyl ether (1:1 by volume) and the resulting mixture kept at 4° C. for about 16 hours. The resulting precipitate is recovered by centrifugation and dried under reduced pressure.

The dried precipitate is dissolved in 2 ml. of water, the pH adjusted to 8.5 by the addition of ammonia and the solution stored at 4° C. for 16 hours. The resulting precipitate is recovered by centrifugation and discarded.

To the resulting supernatant layer consisting of 1.6 ml. is added 10 volumes of ethanol-ethyl ether (1:1 by volume) and the solution maintained at 4° C. for 16 hours. The resulting precipitate consisting of the biochemically active polypeptide is recovered by centrifugation and dried to afford 14.6 mg. of active peptide in the form of a white powder.

The biochemically active polypeptide obtained in accordance with the foregoing examples is characterized by the following properties:

(1) It is an electrophoretically homogeneous product having a molecular weight between 6600 and 8000.

(2) When tested in plateaued female rats, the polypeptide of this invention acts as a growth promoting agent. In carrying out this test, rats were divided into three groups of 8 animals. The first group was given 0.5 mg. of the active polypeptide daily for 6 days. The second group was given 0.5 mg. of the heat inactivated polypeptide daily for 6 days. This last group was also given 1 ml. of saline daily for 6 days. All groups were weighed daily. Only the group given the active polypeptide (i.e. group 1 above) showed an increase in size and weight.

(3) The active polypeptide produces a tibial epiphyseal response in hypophysectomised female rats when assayed in accordance with standard procedures known in the art.

(4) The polypeptide also causes the oxidation of glucose by various tissues when tested in accordance with procedures described by Bornstein et al. in Nature, 176, 788 (1955).

(5) It accelerates the incorporation of $C^{14}$ amino acids into protein of tissues when tested by the procedures of Manchester et al. in Biochem. J. 72, 136 (1959).

(6) It accelerates the utilization of glucose by muscle.

(7) It accelerates the glucose uptake by the rat diaphragm when tested by the procedure of Park et al. in J. Biol. Chem. 195, 197 (1952).

The new peptide of the present invention is a valuable biochemically active compound which can be used for comparison with other biochemical substances. Additionally, as pointed out above, this polypeptide acts as a growth promoting agent for animals.

Various changes and modifications of the invention can be made and, to the extent that such variations incorporate the spirit of this invention, they are intended to be included within the scope of the appended claim.

What is claimed is:

A process for preparing and isolating a biochemically active polypeptide which comprises subjecting growth hormone of sheep pituitary to partial acid hydrolysis at a pH between about 1.5 to about 2.5 in an extraction solvent consisting of 4 volumes of ethanol, 0.4 volume of butanol, 0.4 volume of toluene and 1 volume of water, recovering and drying the insoluble portion from the extraction solvent, extracting the dried insoluble portion with 0.1 M acetic acid, filtering the acetic acid extracts through an ultrafilter, passing the ultrafiltrate through a cation exchange resin on the hydrogen cycle, recovering the unabsorbed material by washing with water, adding to this aqueous solution an ethanol-ethyl ether mixture in an amount sufficient to precipitate the active polypeptide, recovering and drying the resulting precipitate, dissolving said dried precipitate in water and adjusting the pH of the solution to about 8.5 with ammonia, filtering the resulting solution, adding a mixture of ethanol and ether to the filtered solution, and recovering and drying the resulting precipitated active polypeptide product.

References Cited by the Examiner

LI: Journal of Biological Chemistry, vol. 218, pages 33–52 (1956).

Raben: Science, vol. 125, pages 883–884 (1957).

WILLIAM H. SHORT, *Primary Examiner.*

LEON ZITVER, *Examiner.*